(12) United States Patent
Cho et al.

(10) Patent No.: US 10,913,341 B2
(45) Date of Patent: Feb. 9, 2021

(54) POWER TRANSMISSION APPARATUS OF HYBRID ELECTRIC VEHICLE

(71) Applicants: HYUNDAI MOTOR COMPANY, Seoul (KR); KIA MOTORS CORPORATION, Seoul (KR)

(72) Inventors: Wonmin Cho, Hwaseong-si (KR); Kijong Park, Hwaseong-si (KR); Yong Uk Shin, Suwon-si (KR); Seongwook Ji, Gunpo-si (KR); Woochurl Son, Seongnam-si (KR); Ki Been Lim, Yongin-si (KR); Ki Dong Kim, Anyang-si (KR); Woo Jin Chang, Suwon-si (KR); Seong Wook Hwang, Gunpo-si (KR); Ki Tae Kim, Incheon (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/545,222

(22) Filed: Aug. 20, 2019

(65) Prior Publication Data

US 2020/0171931 A1    Jun. 4, 2020

(30) Foreign Application Priority Data

Dec. 4, 2018    (KR) .......................... 10-2018-0154497

(51) Int. Cl.
*B60K 6/365*    (2007.10)
*B60K 6/442*    (2007.10)
(Continued)

(52) U.S. Cl.
CPC .............. *B60K 6/365* (2013.01); *B60K 6/442* (2013.01); *B60K 6/547* (2013.01);
(Continued)

(58) Field of Classification Search
CPC ........ B60K 6/365; B60K 6/442; B60K 6/547; B60K 6/543; F16H 37/0806;
(Continued)

(56) References Cited

U.S. PATENT DOCUMENTS 7,086,977 B2 * 8/2006 Supina ..................... B60L 50/16
                                                    475/5
9,140,343 B1 * 9/2015 Kim ....................... B60K 6/405
(Continued)

*Primary Examiner* — Tisha D Lewis
(74) *Attorney, Agent, or Firm* — Brinks Gilson & Lione

(57) ABSTRACT

A power transmission apparatus for a hybrid electric vehicle includes: a planetary gear set including first, second and third rotary elements; a first shaft fixedly connected to an output shaft of an engine; a second shaft fixedly connected to the first rotary element and a first motor/generator; a third shaft receiving rotational power from the first shaft; a fourth shaft selectively connected with the first shaft, and the fourth shaft selectively receiving rotational power from the first shaft or from the third rotary element; a fifth shaft fixedly connected to a second motor/generator; and a sixth shaft transmitting rotational power transmitted from the fifth shaft to a final reduction gear of the differential gear. In particular, the six shafts are connected to external gears mutually by four gear sets so that rotational power is transmitted.

3 Claims, 2 Drawing Sheets

Figure 1:
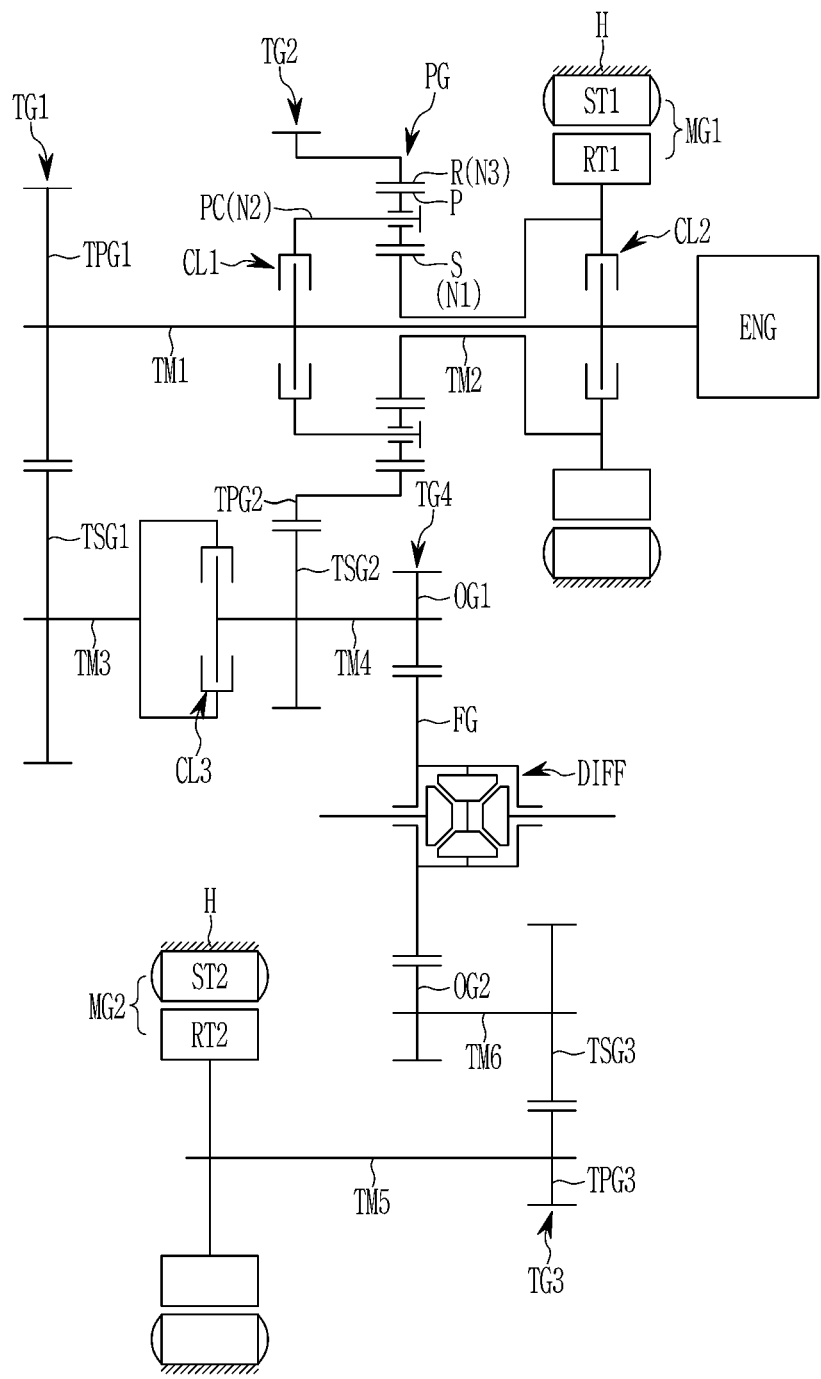

(51) Int. Cl.
*F16H 37/08* (2006.01)
*B60K 6/547* (2007.10)
*B60K 6/543* (2007.10)

(52) U.S. Cl.
CPC .......... *F16H 37/0806* (2013.01); *B60K 6/543* (2013.01); *F16H 2200/2005* (2013.01); *F16H 2702/02* (2013.01)

(58) Field of Classification Search
CPC ......... F16H 2200/2005; F16H 2702/02; F16H 2037/048
See application file for complete search history.

(56) References Cited

U.S. PATENT DOCUMENTS

| | | | |
|---|---|---|---|
| 10,286,771 B2* | 5/2019 | Kanada | F16H 3/728 |
| 2013/0035186 A1* | 2/2013 | Martin | B60K 6/445 |
| | | | 475/5 |
| 2016/0167501 A1* | 6/2016 | Ji | B60K 6/442 |
| | | | 475/5 |
| 2017/0166200 A1* | 6/2017 | Miyagawa | B60W 20/40 |
| 2018/0208044 A1* | 7/2018 | Imamura | B60K 6/38 |
| 2019/0337376 A1* | 11/2019 | Ore | B60K 6/36 |
| 2020/0063842 A1* | 2/2020 | Hwang | F16H 3/44 |

* cited by examiner

FIG. 2

| Running mode | | | Friction element | | | MG1 | MG2 | ENG |
|---|---|---|---|---|---|---|---|---|
| | | | CL1 | CL2 | CL3 | | | |
| EV running mode | | | - | - | - | □ | ■ | □ |
| HEV running mode | Series mode | | - | ● | - | ■ | ■ | ■ |
| | e-CVT mode | | ● | - | - | ■ | ■ | ■ |
| | Parellel mode | First sub mode (1-1) | - | ● | ● | ■ | ▨ | ■ |
| | | Second sub mode (1-2) | - | - | ● | □ | ■ | ■ |
| | | Second shift | ● | ● | - | ▨ | ■ | ■ |
| Engine running mode | First shift | | - | - | ● | □ | □ | ■ |
| | Second shift | | ● | ● | - | □ | □ | ■ |

● : Operation
■ : Driving
□ : Non-driving
▨ : Driving or Non-driving selectable

POWER TRANSMISSION APPARATUS OF HYBRID ELECTRIC VEHICLE

CROSS-REFERENCE TO RELATED APPLICATION

This application claims priority to and the benefit of Korean Patent Application No. 10-2018-0154497, filed on Dec. 4, 2018, the entire contents of which are incorporated herein by reference.

FIELD

The present disclosure relates to a power transmission apparatus for a hybrid electric vehicle. More particularly, the present disclosure relates to a power transmission apparatus for a hybrid vehicle capable of improving the fuel efficiency by changing the traveling mode according to the driving state of the vehicle.

BACKGROUND

The statements in this section merely provide background information related to the present disclosure and may not constitute prior art.

An environmentally-friendly technology of a vehicle is a core technology which controls survival of a future automobile industry, and advanced car makers have focused their energy on the development of an environmentally-friendly vehicle to comply with environmental and fuel efficiency regulations.

Therefore, car makers have developed an electric vehicle (EV), a hybrid electric vehicle (HEV), a fuel cell electric vehicle (FCEV), and the like, as future vehicle technologies.

Since the future vehicles face various technological challenges such as a weight and cost, the vehicle makers have paid attention to the hybrid electric vehicle as an alternative to meet exhaust gas regulations and improve fuel efficiency performance and have entered into keen competition for commercializing the hybrid electric vehicle.

The hybrid electric vehicle is a vehicle using two or more power sources. Two or more power sources may be combined by various schemes. For example, a gasoline engine or a diesel engine using the existing fossil fuel, and a motor/generator driven by electric energy are mixed and used as the power sources.

In the hybrid electric vehicle, an EV mode in which the hybrid electric vehicle is driven by only the motor, an HEV mode using both the engine and the motor, and an ENG mode using only the engine can be implemented according to the combination of the engine and the motor. Further, the hybrid electric vehicle can acquire a significant fuel efficiency enhancement effect as compared with the fuel efficiency of conventional vehicles. In particular, the hybrid electric vehicle is implemented with an idle-stop function by which stopping the engine when the vehicle stops, and a regenerative braking capability that drives a generator by using kinetic energy of the vehicle instead of braking by the existing friction when the vehicle is braked, and stores in a battery electric energy generated at the time of driving the generator and reuses the stored electric energy in driving the vehicle, and the like.

The above information disclosed in this Background section is only for enhancement of understanding of the background of the present disclosure and therefore it may contain information that does not form the prior art that is already known to a person of ordinary skill in the art.

SUMMARY

The present disclosure provides a hybrid vehicle power transmission apparatus capable of simultaneously implementing three hybrid modes with a simple configuration, thereby improving the fuel efficiency by changing the running mode according to the running state of the vehicle.

A power transmission apparatus of for a hybrid electric vehicle using an engine and first and second motor/generators as power sources according to exemplary forms of the present disclosure may include: a planetary gear set including first, second and third rotary elements; a first shaft fixedly connected to an output shaft of the engine and selectively connected to the second rotary element of the planetary gear set; a second shaft formed as a hollow shaft, coaxially and exteriorly disposed with the first shaft without rotational interference, fixedly connected to the first rotary element of the planetary gear set and the first motor/generator, and selectively connected with the first shaft; a third shaft disposed parallel to the first shaft at a predetermined distance and receiving rotational power from the first shaft; a fourth shaft coaxially disposed with the third shaft, selectively connected with the third shaft, and the fourth shaft selectively receiving rotational power from the third shaft or from the third rotary element of the planetary gear set so as to transmit the received rotational power to a final reduction gear of a differential gear; a fifth shaft disposed parallel to the third and fourth shafts and fixedly connected to the second motor/generator; and a sixth shaft disposed parallel to the fifth shaft and transmitting rotational power transmitted from the fifth shaft to the final reduction gear of the differential gear and wherein the first, second, third, fourth, fifth and sixth shafts are connected to external gears mutually by four gear sets so that rotational power is transmitted.

The planetary gear set may be a single pinion planetary gear set including a sun gear, a planetary carrier and a ring gear as the first, second and third rotary elements respectively.

The power transmission apparatus may further include three clutches: first, second and third clutches. The first clutch selectively connects a shaft selected among the six shafts with a rotary element selected among the three rotary elements. The second and third clutches each selectively connect two shafts to each other among the remaining shafts.

In one form, the first clutch is arranged between the first shaft and the second rotary element of the planetary gear set, the second clutch is arranged between the first shaft and the second shaft, and the third clutch is arranged between the third shaft and the fourth shaft.

The four gear sets may include: a first gear set including a first driven gear fixed to the first shaft, and a first driven gear fixed to the third shaft and externally gear-meshed with the first drive gear; a second gear set including a second drive gear fixed to the third rotary element of the planetary gear set, and a second driven gear fixed to the fourth shaft and externally gear-meshed with the second drive gear; a third gear set including a third drive gear fixed to the fifth shaft, and a third driven gear fixed to the sixth shaft and externally gear-meshed with the third drive gear; and a fourth gear set including a first output gear fixed to the fourth shaft, a second output gear fixed to the sixth shaft, and the final reduction gear of the differential gear externally-meshed with the first and second output gears.

The power transmission apparatus for a hybrid vehicle according to the forms of the present disclosure includes three friction elements, one planetary gear set, and nine external gears, and may implements three driving modes including a series mode, an e-CVT Mode and a parallel mode. Therefore, the mileage can be improved by changing the driving mode according to the driving state of the vehicle The power transmission apparatus for a hybrid vehicle according to the forms of the present disclosure can contribute to the reduction of production cost and the weight reduction by a simple structure.

In addition, effects obtainable or predicted by the forms of the present disclosure will be directly or implicitly disclosed in the detailed description of the forms of the present disclosure. That is, various effects to be predicted according to the form of the present disclosure will be disclosed in the detailed description to be described later.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic diagram of a power transmission apparatus of a hybrid electric vehicle according to an exemplary form of the present disclosure; and FIG. 2 is an operation table for each operation mode of a friction element applied to the power transmission apparatus for a hybrid vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic diagram of a power transmission apparatus of a hybrid electric vehicle according to an exemplary form of the present disclosure.

Referring to FIG. 1, A power transmission apparatus of a hybrid electric vehicle according to an exemplary form of the present disclosure may include an engine ENG and first and second motor/generators MG1 and MG2 as power sources, six shafts TM1-TM6, three friction elements CL1, CL2, and CL3. And rotational powers from the engine ENG and the first and second motor/generators MG1 and MG2 are transmitted to a final reduction gear FG of a differential gear DIFF.

As the main power source, the engine ENG may be a known various engine such as a gasoline engine or a diesel engine using conventional fossil fuels.

The first and second motor/generators MG1 and MG2 serve as an auxiliary power source and function as a motor and a generator as known in the art and each have a first and a second stator ST1 and ST2 fixed to a transmission housing H, and a first and a second rotor RT1 and RT2 rotatably supported inside the stators ST1 and ST2 in the radial direction.

The planetary gear set PG is a single pinion planetary gear set and includes a sun gear S as a first rotation element N1, a planet carrier PC as a second rotation element N2 rotatably supporting a plurality of pinion gears P externally gear-meshed with the sun gear S, and a ring gear R as a third rotation element N3 internally gear-meshed with the plurality of pinion gears P.

The engine ENG, the first/second motor/generators MG1 and MG2 and the planetary gear set PG are connected to each other via the six shafts TM1 to TM6 so as to transmit power.

That is, the configuration of the six shafts TM1 to TM6 will be described in detail.

The first shaft TM1 is fixedly connected to an output shaft of the engine ENG and selectively connected to the planet carrier PC as the second rotary element N2 of the planetary gear set PG.

Here, the term "fixedly connected" or the like means at least two members are connected to each other to always rotate together. Therefore, it is to be understood by a person of an ordinary skill in the art that the term "fixedly connected" or the like differs from the term "operably connected" or the like.

The first shaft TM1 may mean an input shaft that transmits the rotational power of the engine ENG.

The second shaft TM2 formed as a hollow shaft, is coaxially and exteriorly disposed with the first shaft TM1 without rotational interference, fixedly connected to the sun gear S as the first rotary element N12 of the planetary gear set PG and the first motor/generator MG1, and selectively connected with the first shaft TM1.

The second shaft TM2 means a shaft which is integrally connected to a motor shaft connected to the first rotor RT1 of the first motor generator MG1 and the rotational power of the first motor that transmits the rotational power of the first motor/generator MG1 to the planetary gear set PG, or selectively transmits the rotational power of the engine ENG to the planetary gear set PG.

The third shaft TM3 is an intermediate shaft disposed parallel to the first shaft TM1 at a predetermined interval and receives rotational power from the first shaft TM1.

The fourth shaft TM4 is an intermediate shaft, coaxially disposed with the third shaft TM3, selectively connected with the third shaft TM3, and the fourth shaft selectively receiving rotational power from the third shaft TM3 or from the ring gear R as the third rotatory element N3 of the planetary gear set PG so as to transmit the received rotational power to the final reduction gear FG of the differential DIFF.

The fifth shaft TM5 is disposed parallel to the third and fourth shafts TM3 and TM4 and fixedly connected to the second motor/generator MG2.

The fifth shaft TM5 may refer to a shaft integrally connected to a motor shaft connected to the rotor of the second motor/generator MG2.

The sixth shaft TM6 is an intermediate shaft, disposed parallel to the fifth shaft TM5 and transmits rotational power transmitted from the fifth shaft TM5 to the final reduction gear FG of the differential DIFF.

The shafts TM1-TM6 are connected to external gears mutually by first, second, third and fourth gear sets TG1, TG2, TG3 and TG4 so that rotational power is transmitted.

The first gear set TG1 includes a first drive gear TPG1 fixed to the first shaft TM1, and a first driven gear TSG1 fixed to the third shaft TM3 and externally gear-meshed with the first drive gear TPG1.

The second gear set TG2 includes a second drive gear TPG2 fixed to the ring gear R as the third rotary element N3 of the planetary gear set PG, and a second driven gear TSG2 fixed to the fourth shaft TM4 and externally gear-meshed with the second drive gear TPG2.

The third gear set TG3 includes a third drive gear TPG3 fixed to the fifth shaft TM5, and a third driven gear TSG3 fixed to the sixth shaft TM6 and externally gear-meshed with the third drive gear TPG3.

The fourth gear set TG4 includes a first output gear OS1 fixed to the fourth shaft TM4, a second output gear OS2 fixed to the sixth shaft TM6, and the final reduction gear FG of the differential DIFF externally-meshed with the first and second output gears OG1 and OG2.

Gear ratios of the first, second, and third drive gears TPG1, TPG2 and TPG3, the first, second and third driven gears TSG1, TS2 and TS3, the first and second output gears OG1 and OG2 and the final reduction gear FG are set according to the design conditions of the transmission.

The power transmission apparatus further includes three clutches CL1, CL2 and CL3 selectively connecting any one of the shafts and any one of the other shafts or any one of the shafts and any one of the rotatory elements.

The positions of the three clutches CL1, CL2 and CL3 will be described below.

The first clutch CL1 is disposed between the first shaft TM1 and the second rotatory element N2 of the planetary gear set PG and selectively connects the first shaft TM1 and the second rotatory element N2 of the planetary gear set PG to transmit the power.

The second clutch CL2 is disposed between the first shaft TM1 and the second shaft TM2 and selectively connects the first shaft TM1 and the second shaft TM2 to transmit the power.

The third clutch CL3 is disposed between the third shaft TM3 and the fourth shaft TM4 and selectively connects the third shaft TM3 and the fourth shaft TM4 to transmit the power.

The engagement elements of the first, second and third clutches CL1, CL2 and CL3 may be realized as multi-plate hydraulic pressure friction devices that are frictionally engaged by hydraulic pressure, however, it should not be understood to be limited thereto, since various other configuration that are electrically controllable may be available.

FIG. 2 is an operation table for each operation mode of a friction element applied to the power transmission apparatus for a hybrid vehicle according to the form of the present disclosure.

[Electric Vehicle Mode (EV Running Mode)]

In the EV running mode, the second motor/generator MG2 is driven with the engine ENG stopped.

The rotational power of the second motor/generator MG2 is transmitted to the differential gear DIFF via the fifth shaft TM5, the third drive gear TPS3, the third driven gear TSP3, the sixth shaft TM6, the fourth gear set TG4 to enable driving in the electric vehicle running mode.

[Series Mode]

In the series mode, the second clutch CL2 is operated in a state in which the engine ENG and the first and second motor/generators MG1 and MG2 are driven.

The rotational power of the engine ENG and the rotational power of the first motor/generator MG1 are joined at the second shaft TM2 by the operation of the second clutch CL2 and input to the planetary gear set PG.

The rotational power of the second motor/generator MG2 is transmitted to the differential gear DIFF via the fifth shaft TM5, the third gear set TG3, the sixth shaft TM6 and the fourth gear set TG4.

In this case, the final reduction gear FG is mechanically and externally connected to the ring gear R which is the third rotary element N3 of the planetary gear set PG via the fourth shaft TM4, 1, and the series running is performed while the engine ENG and the first and second motor/generators MG1 and MG2 are complementarily controlled.

[e-CVT Mode]

The e-CVT (electrically Continuously Variable Transmission (e-CVT) is an electric CVT in which the motor/generator consists of one or more planetary gear sets and two motors/generators, such as CVT, with continuously variable transmission function In this e-CVT mode, the first clutch CL1 is actuated in a state in which the engine ENG and the first and second motor/generators MG1 and MG2 are driven.

While the rotational power of the engine ENG is input to the planetary carrier PC which is the second rotary element N2 of the planetary gear set PG by the operation of the first clutch CL1, the e-CVT mode is performed by complementary control of the first and second motor/generators MG1 and MG2 which are mechanically connected to each other.

[Parallel Mode First Shift]

The parallel mode first shift is performed as a first sub mode 1-1 and a second sub mode 1-2. In the first sub mode (1-1), the engine ENG and the first motor/generator MG1 are driven and the second and third clutches CL2 and CL3 are operated.

Then, the rotational power of the engine ENG and the rotational power of the first motor/generator MG1 are joined at the second shaft TM2 by the operation of the second clutch CL2 and input to the planetary gear set PG.

A part of the rotational power of the engine ENG is transmitted to the third shaft TM3 through the first gear set TG1 and then to the fourth shaft TM4 by the operation of the third clutch CL3.

Accordingly, the rotational power output from the planetary gear set PG and the rotational power transmitted from the third shaft TM3 are combined at the fourth shaft TM4 then to the differential gear DIFF so that the first sub mode 1-1 of the parallel mode first shift is performed.

At this time, the second motor/generator MG may be selected to be driven or not driven.

In the second sub mode 1-2 of the parallel mode first shift, the engine ENG and the second motor/generator MG2 are driven and the third clutch CL3 is operated Then, the rotational power of the engine ENG is transmitted to the third shaft TM3 through the first shaft TM1 and the first gear set TG1, and is then transmitted to the fourth shaft TM4 by the operation of the third clutch CL4.

The rotational power transmitted to the fourth shaft TM4 is outputted through the differential DIFF via the fourth gear set TG4 and thus the second sub mode 1-2 of the parallel mode first shift is performed.

The rotational power of the second motor/generator MG2 is transmitted to the differential gear DIFF through the fifth shaft TM5, the third gear set TG3, the sixth shaft TM6 and the fourth gear set TG4 and the second motor/generator MG2 is operated as an auxiliary power for the engine ENG.

[Parallel Mode Second Shift]

In the parallel mode second shift, the first and second clutches CL1 and CL2 are operated in a state in which the engine ENG and the second motor/generator MG2 are driven.

The rotational power of the engine ENG is transmitted to the sun gear S and the planet carrier PC2 as the first and second rotary elements N1 and N2 of the planetary gear set PG by the operation of the first and second clutches CL1 and CL2.

Since the rotational power of the engine ENG is input at the same number of revolutions in the planetary gear set PG, the input is directly output through the ring gear R, which is the third rotatory element N3, and the rotational power of the ring gear R is transmitted to the differential gear DIFF via the second gear set TG2, the fourth shaft TM4 and the fourth gear set TG4 to perform the parallel mode second shift.

The rotational power of the second motor/generator MG2 is transmitted to the differential gear DIFF through the fifth shaft TM5, the third gear set TG3, the sixth shaft TM6 and the fourth gear set TG4 and the second motor/generator MG2 is operated as an auxiliary power for the engine ENG.

[Engine Running Mode First Shift]

In the engine running mode first shift, the third clutch CL3 is operated in a state in which the engine ENG is being driven.

The rotational power of the engine ENG is transmitted to the third shat TM3 through the first shaft TM1 and the first gear set TG1 and then transmitted to the fourth shaft TM4 by the operation of the third clutch CL4.

The rotational power transmitted to the fourth shaft TM4 is output to the differential gear DIFF through the fourth gear set TG4 and the engine running mode first shift is performed.

That is, while the rotational power of the engine ENG is shifted by the gear ratio of the first gear set TG1 and the fourth gear set TG4 and outputted, the engine running mode first shift is performed.

[Engine Running Mode Second Shift]

In the engine running mode second shift, the first and second clutches CL1 and CL2 are operated in a state in which the engine ENG is being driven.

The rotational power of the engine ENG is transmitted to the sun gear S and the planet carrier PC2 as the first and second rotary elements N1 and N2 of the planetary gear set PG by the operation of the first and second clutches CL1 and CL2.

Since the rotational power of the engine ENG is input at the same number of revolutions in the planetary gear set PG, the input is directly output through the ring gear R, which is the third rotatory element N3, and the rotational power of the ring gear R is transmitted to the differential gear DIFF via the second gear set TG2, the fourth shaft TM4 and the fourth gear set TG4 to perform the engine running mode second shift.

That is, the rotational power of the engine ENG is shifted by the gear ratios of the second gear set TG2 and the fourth gear set TG4 to be outputted and the engine running mode second shift is performed.

As describe above, the power transmission apparatus for a hybrid vehicle according to the forms of the present disclosure includes three friction elements, one planetary gear set, and nine external gears, and may implements three driving modes including a series mode, an e-CVT Mode and a parallel mode. Therefore, the mileage can be improved by changing the driving mode according to the driving state of the vehicle The power transmission apparatus for a hybrid vehicle according to the forms of the present disclosure can contribute to the reduction of production cost and the weight reduction by a simple structure.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

ENG: engine
PG: planetary gear set
MG1,MG2: first, second motor/generators
N1,N2,N3: first, second, third rotary elements
TM1,TM2,TM3,TM4,TM5,TM6: first, second, third, fourth, fifth, sixth shafts
TG1, TG2, TG3, TG4: first, second, third, fourth gear sets
TPG1,TPG2,TPG3: first, second, third drive gears
TSG1,TSG2,TSG3: first, second, third driven gears
DIFF: differential
FG: final reduction gear

What is claimed is:

1. A power transmission apparatus of a hybrid electric vehicle using an engine and first and second motor/generators as power sources, the power transmission apparatus comprising:
   a planetary gear set including first, second and third rotary elements;
   a first shaft fixedly connected to an output shaft of the engine and selectively connected to the second rotary element of the planetary gear set;
   a second shaft formed as a hollow shaft, coaxially and exteriorly disposed with the first shaft without rotational interference, fixedly connected to the first rotary element of the planetary gear set and the first motor/generator, and selectively connected with the first shaft;
   a third shaft disposed parallel to the first shaft at a predetermined distance and receiving rotational power from the first shaft;
   a fourth shaft coaxially disposed with the third shaft, selectively connected with the third shaft, and the fourth shaft receiving rotational power from the third shaft or from the third rotary element of the planetary gear set so as to transmit the received rotational power to a final reduction gear of a differential gear;
   a fifth shaft disposed parallel to the third and fourth shafts and fixedly connected to the second motor/generator;
   a sixth shaft disposed parallel to the fifth shaft and transmitting rotational power transmitted from the fifth shaft to the final reduction gear of the differential gear;
   a first clutch arranged between the first shaft and the second rotary element of the planetary gear set and configured to selectively connect the first shaft and the second rotary element of the planetary gear set;

a second clutch is arranged between the first shaft and the second shaft and configured to selectively connect the first shaft and the second shaft; and a third clutch is arranged between the third shaft and the fourth shaft and configured to selectively connect the third shaft and the fourth shaft, wherein the first, second, third, fourth, fifth and sixth shafts are connected to external gears mutually by four gear sets so that rotational power is transmitted.

2. The power transmission apparatus of claim 1, wherein the planetary gear set is a single pinion planetary gear set including a sun gear, a planetary carrier and a ring gear as the first, second and third rotary elements respectively.

3. The power transmission apparatus of claim 1, wherein the four gear sets comprise:

a first gear set including a first drive gear fixed to the first shaft, and a first driven gear fixed to the third shaft and externally gear-meshed with the first drive gear;

a second gear set including a second drive gear fixed to the third rotary element of the planetary gear set, and a second driven gear fixed to the fourth shaft and externally gear-meshed with the second drive gear;

a third gear set including a third drive gear fixed to the fifth shaft, and a third driven gear fixed to the sixth shaft and externally gear-meshed with the third drive gear; and a fourth gear set including a first output gear fixed to the fourth shaft, a second output gear fixed to the sixth shaft, and the final reduction gear of the differential gear externally-meshed with the first and second output gears.

* * * * *